United States Patent Office 3,819,814
Patented June 25, 1974

3,819,814
PLURAL MOLDED DIAMOND ARTICLES AND THEIR MANUFACTURE FROM DIAMOND POWDERS UNDER HIGH TEMPERATURE AND PRESSURE
Bill J. Pope, Provo, Utah, assignor to Megadiamond Corporation, Provo, Utah
Filed Nov. 1, 1972, Ser. No. 302,986
Int. Cl. C01b 31/06
U.S. Cl. 423—446    5 Claims

ABSTRACT OF THE DISCLOSURE

A sintered diamond article and process for producing same, the process including providing a plural cavity mold, packing the mold cavity with particulate diamond with or without additives and thereafter sintering the particulate diamond under high temperature and high pressure to form a solid, non-porous diamond mass in the configuration of the mold cavity.

BACKGROUND

Field of the Invention

The invention relates to diamond articles and more particularly to novel sintered diamond articles and a unique process for sintering the articles in a predetermined configuration.

The Prior Art

The manufacture of phonograph styli from single diamond and sapphire crystal was first introduced as early as 1910 by Thomas Edison. The Edison process was principally a grinding process for shaping the single crystal diamonds and sapphires.

The best known method currently used in making diamond phonograph points, styli, scribers and the like is to grind small ($\frac{1}{20}$ to $\frac{1}{50}$ karat) single crystal natural diamonds to cylindrical shape on a diamond wheel. The process most commonly used is referred to as centerless grinding. When the diamonds have been ground to a cylindrical shape, one end of the cylinder is ground to the desired point and the diamond is thereafter polished in its final form. For phonograph needles, a 45°–50° cone is formed on the cylinder with a blended tip radius of 0.0007 inch which must be accurate to 0.0001 inch. The tip radius may be 0.0005 inch to 0.0007 inch or 0.0007 to 0.0009 inch for stereo use. The monaural range is 0.0009 inch to 0.0010 inch. Conventional hi-fidelity phonograph needles are made circular in tip cross-section; however, for superior quality, the needles are made elliptical in cross-section with 0.0004 inch on the minor axis and 0.0009 inch on the major axis. The process of making elliptical needles is a much more difficult grinding process. This invention permits the molding of needles elliptical in cross-section.

Conventionally, roughing is performed with a 180–240 grit vitrified wheel and followed by processing the diamond on a coning wheel which is 500–600 grit diamond. Final end radiusing and polishing is against a 1200 grit wheel or sometimes by tumbling. In order to adequately form the diamond needles, styli and the like according to the foregoing procedure, proper fixturing, quality control and uniform, light pressure is necessary to bring the point into tolerance as checked on a comparator against master contours. Because the diamond styli are so tiny and because the tolerances required are so critically small, the diamond styli formed according to this procedure are extremely expensive and a great deal of time and effort is necessary to manufacture even a single diamond stylus.

Moreover, for a variety of reasons, appropriate stylus sizes cannot be achieved using the common centerless grinding technique. The length of the stylus will be dependent upon the original crystal length, which is variable. The average diameter for a phonograph needle is approximately 0.012 inch and the average length is about 0.028 inch. While the diameter is controllable within rough limits, the cylinders must all be sorted into various sizes and matched with corresponding metal stylus holder tubes in which they are conventionally mounted.

In recent years, on the theory that only the tip of a stylus requires diamond surface, techniques were developed for bonding diamond crystal to the tip of a steel shank in order to reduce costs. The procedure for forming the point and final polishing of the point described with respect to the solid diamond above is still necessary. However, the steel shank stylus has a weight which is more than twice that of an equivalent size solid diamond needle. Molybdenum has also been used for shank material but its higher density makes molybdenum shank even heavier than steel shank.

With the continuing development of hi-fidelity sound systems, including stereo sound, ever higher quality demands are made on the pickup cartridge of the sound system. Those demands can be met only by a very low mass long-wearing stylus. Steel and molybdenum shank styli, particularly because of their high mass and wear properties, are substantially less desirable than diamond. The smaller the moving mass in the sensing head, the less distortion of the higher frequencies of sound picked up. Therefore, as the equivalent mass of the vibrating system is made smaller, the response characteristics of the pickup carriage are extended. The specific gravity of the various materials used as phonographic needle styli is shown in Table 1 below:

TABLE 1

| Material: | Specific gravity |
|---|---|
| Sintered diamond | 3.1–3.3 |
| Aluminum alloys | 2.7–3.5 |
| Natural diamond | 3.51 |
| Sapphire | 4.0 |
| Titanium | 4.5 |
| Steel | 7.6–7.8 |
| Molybdenum | 10.2 |

When single crystals of natural diamond are used in forming phonograph needles, styli, scribers and such other tools, the diamond grinding and lapping steps remove from one-third to one-half of a diamond at considerable expense of time and materials. A major portion of the final cost of a finished phonograph needle or stylus is represented in the grinding operation.

Another principal disadvantage of single crystal natural diamond is that it exhibits non-isotropic wear properties, i.e. in certain vectors different hardness and wear properties of diamond are evident. Uneven wear on a conical point can cause a distortion of sound reproduction in stereophonic record production and also result in premature record wear. This uneven wear can be detrimental in the performance of styli and scribers also. A method has been proposed to minimize uneven wear using X-ray orientation of a single diamond crystal so that the soft vector of the crystal is not exposed to the most severe wear. The X-ray orientation of the needle suggested by this method would be prohibitively expensive initially because the direction indexing on the original crystal must be maintained in the manufacturing process until the stylus, shank and pickup cartridge are completed and mounted together.

Until this present invention, no stylus has been available which (1) has the wear resistance of diamond, (2) has a mass at least as low as diamond, (3) can be formed in any desired stylus configuration without substantial grinding and shaping, and (4) can be made in uniform sizes at low cost.

BRIEF SUMMARY AND OBJECTS OF THE INVENTION

The present invention comprises a sintered diamond stylus and method of manufacturing styli which not only have a lower mass than existing styli but have superior wear properties corresponding or exceeding those of natural diamond and which are made by a molding process rather than by the expensive diamond grinding. In addition, diamond styli and other products of any desired uniform size can be manufactured without dependence or reliance upon the non-uniformity of single crystal diamonds.

It is, therefore, a primary object of the present invention to provide a novel process for forming diamond articles.

One still further object of the present invention is to provide an improved phonograph needle having a density generally lower than that of single crystal diamond, with hardness and wear resistance equal to or superior to that of natural diamond, and possessing non-isotropic properties in contrast to the isotropic hardness characteristic of natural diamond.

One still further valuable object of the present invention is to provide a high pressure, high temperature sintering process for molding diamond articles to a final configuration.

These and other objects and features of the present invention will become more fully apparent from the following description and appended claims taken in conjunction with the accompanying drawing.

DETAILED DESCRIPTION OF THE PREFERRED EMBODIMENTS

General

This invention is directed toward the process of molding diamond articles using a sintering process. Sintering in this specification means forming diamond dust, diamond powder or more coarse diamond particles into a unitary diamond lattice under conditions of high temperature and pressure. Particulate diamond is defined herein to mean diamond dust, diamond powder or larger diamond fragments, whether naturally or synthetically created.

Figure 1:
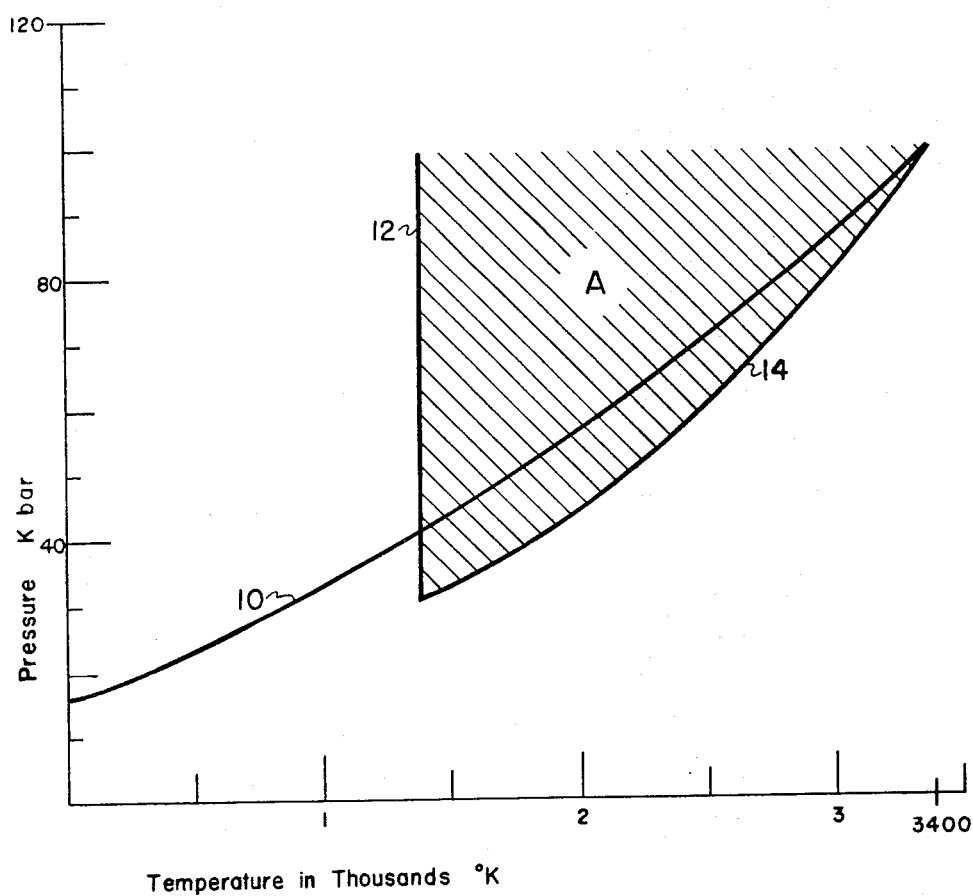
FIG. 1 is a graphical representation of the pressure-temperature zone utilized in the presently preferred embodiments of the invention for sintering diamond.

The process of sintering diamond is known in the art. See, for example, H. T. Hall, "Sintered Diamond, a Synthetic Carbonado," vol. 169 Science, p. 868, Aug. 28, 1970, and U.S. Pat. 3,574,580. The necessary conditions for formation of sintered diamond in accordance with the invention herein can best be understood by reference to FIG. 1. FIG. 1 is a graphical representation of the pressure-temperature zone used for sintering diamond according to one presently preferred embodiment of the invention. Line 10 in FIG. 1 is the thermodynamic equilibrium line, calculated and experimental, for the diamond-graphite system. Above line 10, carbon is stable as diamond and below line 10, graphite is the stable form. Line 12 represents the temperature at which sintering takes place. It should be pointed out that the position of line 12 represents the temperature at which sintering takes place at a sufficiently rapid rate to make it economical. While line 12 may represent a lower temperature, sintering may take place so slowly as to be impractical. Time for satisfactory sintering is reduced as temperature increases. Accordingly, line 12 could be situated at a higher temperature which would have the effect of decreasing the sintering time.

Line 14 in FIG. 1 extends into the graphite stable region in which diamond is metastable. For the specific heating time of three minutes, the area identified as zone A between lines 12 and 14 represents suitable sintering conditions for forming styli by sintering diamond powder. It should be pointed out that line 14 is unique for each heating time. The minimum pressure required to produce satisfactory sintered diamond product at a given temperature within zone A is dependent upon simple geometry, mold material, matrix composition and size distribution of diamond particles within the matrix and time of sintering. In producing diamond styli of particular configurations, it is important to experimentally determine the precise boundaries of zone A and to produce within that zone for the particular sample configuration in order to prevent formation of undesirable non-diamond carbon within the matrix.

The Molding Process

Reference is now made to FIGS. 2–6 directed toward the presently preferred process embodiment of the invention. The process includes sintering particulate diamond within a suitable sintering zone similar to that illustrated in FIG. 1. Sintering takes place within a sample cube 20 illustrated in FIGS. 2 and 3. The sample cube 20 is preferably made of pyrophyllite and is illustrated in longitudinal cross-section in FIG. 3. Two opposed faces 22 and 24 of the sample cube 20 are provided with metallic rings 26 and 28, respectively, which are recessed into the ends 22 and 24 and adapted to deliver current from a cubic press generally designated 30 (FIG. 2) and hereinafter more fully described. Metallic rings 26 and 28 may be formed of steel or other suitable material and enclose pyrophyllite cylinders 32 and 34.

Current disks 36 and 38 desirably formed of molybdenum are situated within the corresponding annular recesses 40 and 42 in the cube 20 so as to make direct contact with the metallic rings 26 and 28. Each of the current disks 36 and 38 is in electrical connection with metallic caps 44 and 46. The metallic caps 44 and 46 are nested within the chamber 48 and serve to close opposed ends of the chamber.

Figure 3:
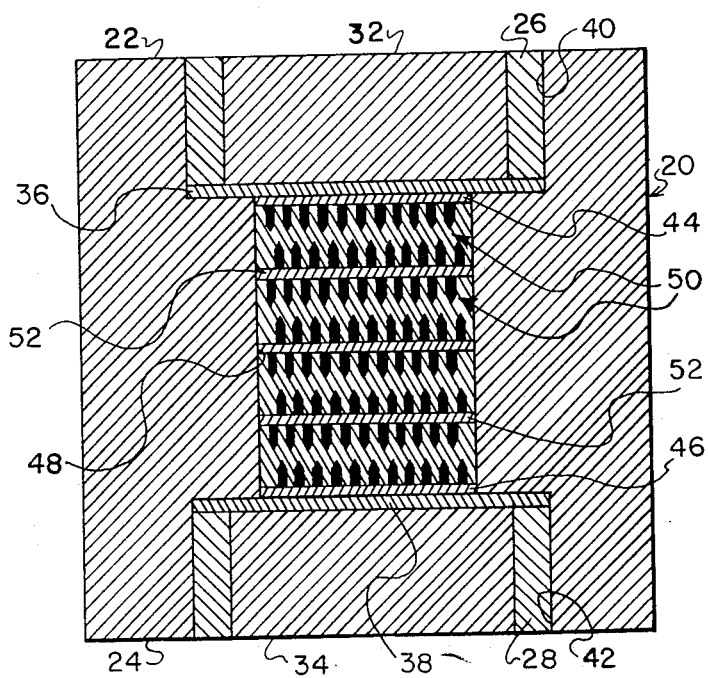
FIG. 3 is a cross-sectional view of the sample holder shown in FIG. 2.

As shown in FIG. 3, the chamber 48 contains a plurality of multi-cavity molds generally designated 50 each of which is separated by a separator disk 52. While graphite multi-cavity molds have been found completely adequate for this purpose, it is apparent that other materials may be used for the multi-cavity molds. For example, metallic multi-cavity molds and cores can be used. However, a high resistance path must be provided by insulating the molds from an external graphite heater so that the appropriate high temperatures required for sintering can be reached. The construction of the multi-cavity mold is best understood by reference to FIG. 4.

Figure 4:
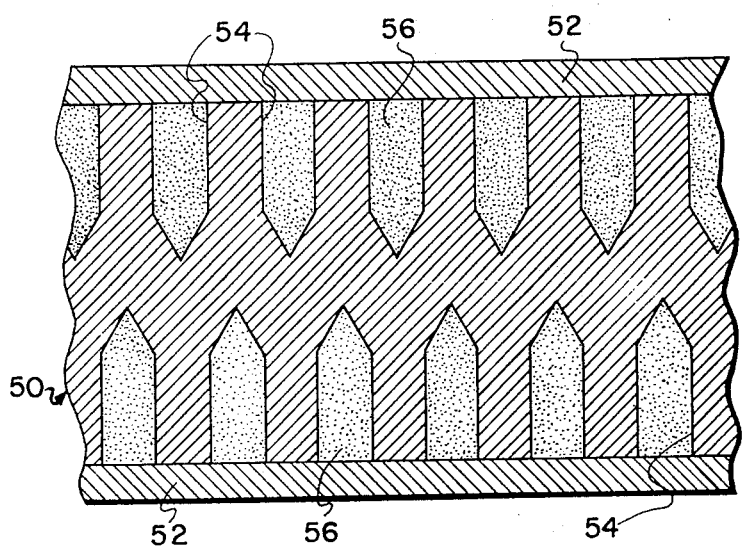
FIG. 4 is an enlarged fragmentary view of a portion of the mold cavity of FIG. 3.

As illustrated in FIG. 4, the mutli-cavity mold 50 is preferably formed of graphite and has a plurality of cavities 54. While the cavities may be of any suitable configuration, in the illustrated embodiment cavities useful for forming diamond phonograph needles are illustrated. Each of the cavities is filled with a diamond matrix 56 which is particulate diamond of either natural or synthetic variety. The sintering zone A illustrated in FIG. 1 was developed for a pure diamond matrix. However, it should be understood that suitable additives to the particulate diamond matrix including non-metals such as silicon and boron, refractory metals and transition metals may be used to modify properties of the sintered diamond. Suitable additives have been found to include one or more of the following elemental materials: nickel, iron, copper, cobalt, boron, silicon, titanium, vanadium, beryllium, ruthenium, rhodium, palladium, osmium, iridium, platinum, chromium, tantalum, manganese, molybdenum, tungsten, technetium. The most desirable of the above listed additives has been found to be silicon, boron, nickel, cobalt and iron. The additives were successfully used in forming molded diamond articles when used in amounts of 6% to 50% additive by weight.

When the cavities 54 have been filled with the matrix 56, as illustrated, the cavities are closed with separator disks 52. The separator disks and multi-cavity molds alternate to fill the cube chamber 48 and the end caps 44 and 46 complete the internal assembly between the current disks 36 and 38.

Figure 2:
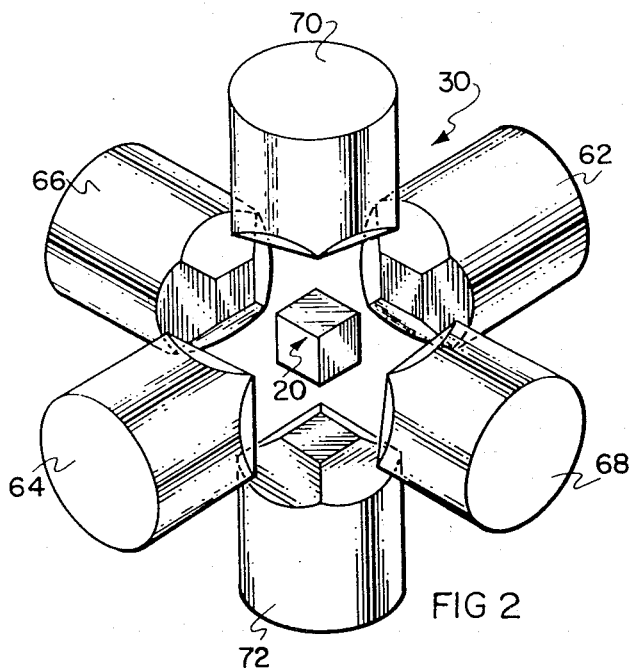
FIG. 2 is a schematic perspective illustration of a preferred high-pressure, high-temperature apparatus and cubic sample holder for sintering diamond particles within the pressure-temperature zone defined in FIG. 1.

After the cube 20 has been assembled, it is preferably painted with an aqueous suspension of red iron oxide and oven dried at a minimum of 100° C. The sample is then positioned in a suitable apparatus capable of producing the conditions of pressure and temperature required for sintering of the material. A particularly useful apparatus for sintering the material is the cubic press schematically illustrated as 30 in FIG. 2 and more particularly described in U.S. Pat. 3,159,876. As schematically represented in FIG. 2, the cubic press 30 has three pair or identical anvils 62 and 64, 66 and 68, 70 and 72. The anvils have square faces which are somewhat smaller in size than the faces of the sample cube 20. The anvils in each pair oppose each other and move together or away from each other rectilinearly along a common axis. The three pair of anvils converge toward the common intersection of the axis of their movement and the six faces engage the cubic faces of sample cube 20. At least one pair of the anvils is insulated from the frame (not shown) of the press 30 and is connected to a source of electrical current.

The sample cube 20 is situated within the cubic press 30 so that the electrically energized anvils engage faces 22 and 24. Accordingly, electric current can be delivered from the anvils through the metallic rings 26 and 28 to the corresponding current disks 36 and 38. The anvils 62 and 64, 66 and 68, 70 and 72 are advanced simultaneously on the sample cube 20 until a desired operating pressure, e.g. 65 kilobars, is reached. Because the anvil faces are smaller than the faces of sample cube 20, the simultaneous application of pressure by the anvils compresses the pyrophyllite outside of the edges of the cube 20. The pyrophyllite is then forced between the anvils at an angle with respect to the face thereby forming a gasket between the anvils.

Current is passed through the anvils in sufficient quantities to bring the temperature to approximately 2200° K for approximately three minutes. The relatively high electrical resistance of the multi-cavity mold 50 rapidly develops the necessary high temperatures to effect sintering. Clearly, any suitable pressure and temperature combination within zone A could be used. After the heating current is cut off, the sample is rapidly cooled to ambient temperature.

It is evident that in sintering diamond particles commencing with particulate diamond at ambient pressure and temperature, it is necessary to traverse pressure and temperature conditions outside of zone A (FIG. 1) in order to bring the diamond particles within the pressure and temperature zone A. Generally speaking, all of the routes passing either above or below line 10 and to the left of line 14 are acceptable in sintering the particulate diamond.

On the other hand, it is highly desirable to prevent the sintered diamond from falling below line 10. In the region below line 10, the diamond particles tend to decompose into non-diamond carbon particles. If it becomes necessary to expose the sintered diamond to conditions below line 10, the exposure in the region should be very rapid. In practice, insurance against decomposition in the region below line 10 can be best taken by reducing the temperature before reducing the pressure.

Figures 5, 6:
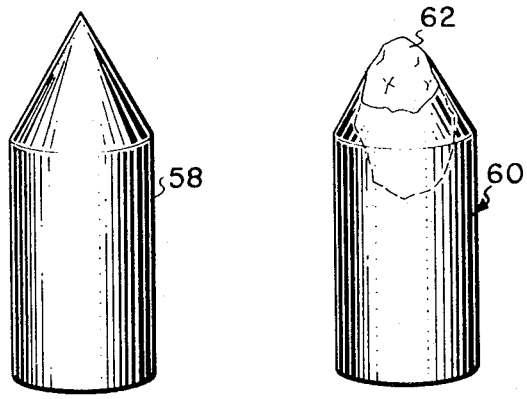
FIG. 5 is an enlarged perspective view of a phonograph needle formed in the mold of FIG. 4.
FIG. 6 is a schematic perspective illustration of a cylindrical shank formed in the mold of FIG. 4 and sintered to a larger single crystal diamond, the point of which is illustrated in the unfinished condition.

When the pressure is then released, the sample cube 20 is taken from the press 30 and opened. Phono points generally in the configuration of FIG. 5 are then removed from the multi-cavity molds. The sintered diamond phonograph stylus illustrated in FIG. 5 may then be made ready for use merely by conventional lapping or tumble polishing to finish the tip radius.

FIG. 6 illustrates another presently preferred stylus embodiment of the invention generally designated 60. The stylus 60 differs from the stylus 58 principally in that a single crystal diamond 62 is sintered into the matrix of the stylus 60. In the FIG. 6 embodiment, the single crystal diamond 62 is illustrated in the yet unfinished condition, it being understood that the diamond 62 may be polished to a suitable point.

The stylus 60 may be prepared in essentially the same way as for stylus 58, described above, except that at the time the cavities 54 (FIG. 4) are filled with particulate diamond matrix, a single crystal diamond is first urged into the tapered tip of the cavity 54. The remainder of the cavity is then filled with particulate diamond matrix and the sample is sintered in the process described. Stylus 60 thus resulting has the single diamond crystal 62 at the tip thereof.

While the present invention has been described with reference to phonograph styli, it will be understood that numerous modifications in the plural cavity molds make this invention equally applicable to the manufacture of jewel bearings for fine instruments, dies, nozzles, contact points, heat sinks, semi-conductor devices, and numerous other shaped articles which best function when they have the characteristics of sintered diamond. The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A process for forming diamond articles comprising the steps of:
   obtaining a mold having a plurality of cavities, each cavity defining the configuration of an article;
   placing particulate diamond into the mold cavities without preconditioning the diamond;
   subjecting the particulate diamond in the mold under atmospheric conditions to the combination of temperatures on the order of about 1500° K. to 3400° K. and pressures on the order of about 30 to 100 kilobars in which diamond is thermodynamically stable, the pressure being directed simultaneously along at least three axes which intersect at the mold such that direct fusion between diamond particles occurs; and
   cooling the fused diamond article before reducing the pressure to ambient.

2. A process as defined in claim 1 wherein said particulate diamond comprises placing into each mold cavity diamond particles having at least two different sizes.

3. A process as defined in claim 1 wherein said cooling step is performed prior to the reduction of pressure below 30 kilobars.

4. A diamond article prepared by:
obtaining a mold having a plurality of cavities, each cavity defining the configuration of an article;
placing particulate diamond into the mold cavities without preconditioning the diamond;
subjecting the particulate diamond in the mould under atmospheric conditions to the combination of temperatures on the order of about 1500° K. to 3400° K. and pressures on the order of about 30 to 100 kilobars in which diamond is thermodynamically stable, the pressure being directed simultaneously along at least three axes which intersect at the mold such that direct fusion between diamond particles occurs; and
cooling the fused diamond article before reducing the pressure to ambient.

5. A method as defined in claim 1 wherein said placing step comprises mixing with the particulate diamond one or more of the elemental materials selected from the group consisting of nickel, iron, copper, cobalt, boron, silicon, titanium, vanadium, beryllium, ruthenium, rhodium, palladium, osmium, iridium, platinum, chromium, tantalum, manganese, molybdenum, tungsten, technetium, in an amount of between about six percent (6%) and fifty percent (50%) by weight.

References Cited

UNITED STATES PATENTS

| | | | |
|---|---|---|---|
| 3,574,580 | 4/1971 | Stromberg et al. | 423—446 |
| 2,169,966 | 8/1939 | Pfanstiehl | 29—148 |
| 2,703,750 | 3/1955 | Cotter | 75—201 |
| 2,068,848 | 1/1937 | De Bats | 75—200 |
| 2,349,825 | 5/1944 | Kelleher | 75—208 R |
| Re. 22,373 | 9/1943 | Benner et al. | 75—208 R |
| 1,939,991 | 12/1933 | Krusell | 75—208 R |
| 3,107,395 | 10/1963 | Bundy | 423—446 |
| 3,150,413 | 9/1964 | Zeitlin et al. | 423—446 |
| 3,201,828 | 8/1965 | Frylund | 423—446 |

FOREIGN PATENTS

| | | | |
|---|---|---|---|
| 858,494 | 1/1961 | Great Britain | 274—38 |

OTHER REFERENCES

Giardini et al.: "Diamond Synthesis: Observations on the Mechanism of Formation," The Amer. Mineralogist, vol. 47, November-December 1962, p. 1395.

STEPHEN J. LECHERT, Jr., Primary Examiner

B. HUNT, Assistant Examiner

U.S. Cl. X.R.

75—200, 201, 226; 264—125; 274—38